Jan. 28, 1969 G. O. FOOT 3,424,466

GRAMOPHONE PICKUPS

Filed Jan. 13, 1966

George Owen Foot

INVENTOR

BY

Laurence E. Laubscher

ATTORNEY

United States Patent Office 3,424,466

Patented Jan. 28, 1969

3,424,466

GRAMOPHONE PICKUPS

George O. Foot, Waltham Cross, England, asignor to Cosmocord Limited

Filed Jan. 13, 1966, Ser. No. 520,403
Claims priority, application Great Britain, Jan. 14, 1965, 1,677/65
U.S. Cl. 274—36 7 Claims
Int. Cl. G11b 3/02

ABSTRACT OF THE DISCLOSURE

Gramophone pickup means including a replaceable stylus unit including stylus carrier means, an attachment member, and compliance means connecting said stylus carrier means with said attachment member. The unit is adapted for replaceable mounting in a sylus holder that is in turn mounted in a casing for rotation about its longitudinal axis, whereby a selected one of a pair of stylus means associated with said stylus carrier is arranged in an operative condition.

This invention relates to gramophone pickups, and the invention has for its object to provide an improved form of construction of gramophone pickups, which is satisfactory in operation and which is simple to manufacture. The invention also makes possible a pickup construction in which stylus replacement can be simply carried out.

It is very often desirable that a gramophone pickup should be capable of use with records which are made to different standards and, specifically, those which for proper reproduction require different styli. For example at the present time it is frequently desired that one pickup cartridge should be usable with standard, or 78 r.p.m. records, and also with microgroove records, and a pickup cartridge may therefore have two styli which can be used alternatively to drive a common transducing means. The invention concerns a gramophone pickup of this kind, in which the styli are carried on a carrier that can be moved angularly to bring alternative styli into playing position.

The invention includes a gramophone pickup comprising a body member, a transducer element mounted on said body member, a drive member for coupling mechanical movement to said element, an elongated stylus carrier mounted for angular movement about its longitudinal axis, and carrying two styli adapted to be brought selectively into playing position at different angular positions of said carrier, a holder mounted for angular movement on said member and providing a receptacle, an attachment member adapted to be received and retained in said receptacle but readily removable from said receptacle, said stylus carrier being attached to said attachment member through a compliant member, and means between stylus carrier for permitting a degree of general freedom of the carrier at least in the region of the styli, but limiting motion of the stylus carrier in the longitudinal direction of said carrier.

Further features and advantages of the invention will appear from the following description of one embodiment thereof, given by way of example, in conjunction with the accompanying drawing, in which.

Figure 3:
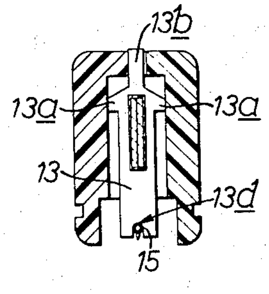
FIGURE 3 is a cross-sectional view taken on the line III—III of FIGURE 1.

The cartridge shown comprises a casing made in two parts 10 and 11, which are complementarily shaped as tray-like members so to form when placed together an interior cavity in the casing. Within this cavity is mounted a piezoelectric bimorph element 12, conveniently of the crystalline twister type, the element being carried by means of two generally similar pads 13 and 14. As is shown more clearly in FIGURE 3, pad 13, arranged at the forward end of element 12, has side portions **13*a* which bear against the walls of the casing, and an upwardly extending portion 13*b* which passes through an aperture formed between the adjacent edges of the casing parts. The lower part of the pad 13 extends downwardly and has a grooved portion 13*d* to receive a a stylus carrier 15; the stylus carrier has two styli 16 and 17 which project in opposite directions from the general longitudinal axis of the carrier. The rear pad 14 has upper projecting portions 14*a* and lower projecting portions 14*b*, all of which are adapted to engage the side walls of the casing, and an upwardly extending projection 14*c* which, like the portion 13*b*, passes through a suitable opening formed in the upper adjacent edges of the two parts of the casing. The function of pad 14 is to impose on the piezoelectric element a restraint against torsional movement, such torsional movement being imposed on the element at its forward end by means of pad 13, in response to movement of the stylus carrier 15. It will be seen that the upper and lower projection portions 14*a*, 14*b* of pad 14** lie adjacent the upper and lower edges of the element, so the desired restraint againt torsional movement. Thus, when the stylus in use moves laterally, that located only adjacent the upper forward edge of the element. Thus, when the stylus in use moves laterally that is, in a direction horizontally and from side to side as seen in FIGURE 3, there will be a twisting strain placed on the element.

The piezoelectric element 12 is provided with electrodes leading to flexible terminal leads 19 and 20 connected to terminal pins 21 and 22, which are adapted to be trapped between the two parts of the casing, when these are secured together, for example by means of rivets passing through registering openings in the two parts of the casing at 23. The stylus carrier 15 is mounted in the cartridge so as to be angularly movable whereby to bring the two styli 16 and 17 alternatively into operative position and also to allow the stylus carrier 15 to be removed for replacement when necessary.

For this purpose, a stylus holder 24, of general circular cross section, is trapped between the two parts of the casing, the holder being rotatable about its longitudinal axis; a finger lever 25 extends outwardly from the axis of the holder, to enable this to be done easily. An indexing device is provided whereby the holder will be retained in either of two angular positions, 180° apart. This comprises a spring 26 of metal, also trapped between the two parts of the casing, and having a cantilever inner end **26*a* which is adapted to bear against one or other of two opposite flat surfaces 24*a*, 24*b*** formed on the holder.

Figure 1:
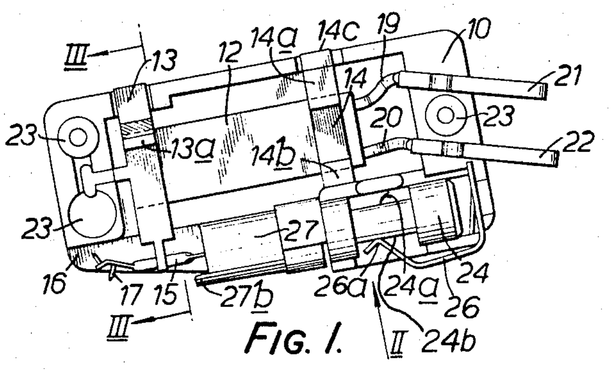
FIGURE 1 is a side elevational view of a gramophone pickup cartridge, with one-half of the casing removed.
Figure 2:
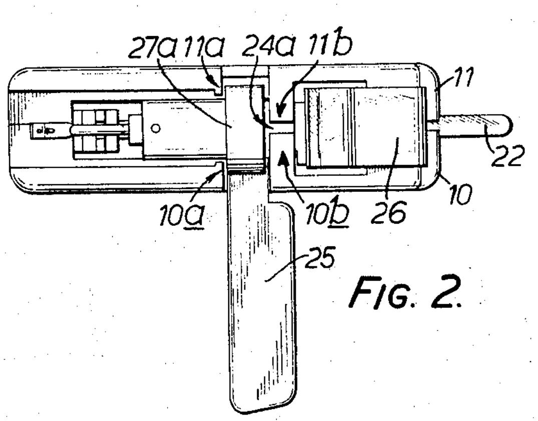
FIGURE 2 is an under plan view of the cartridge of FIGURE 1, looking in the direction of arrow II, in FIGURE 1.
Figure 4:
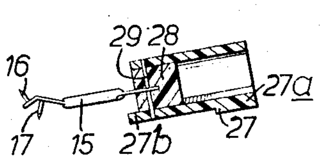
FIGURE 4 is a sectional view through the stylus carrier.

The stylus carrier 15 is compliantly mounted in an attachment member in the form of a fixing plug member 27, which is shown more clearly in FIGURE 4. Plug 27 is tubular and at its forward end has an insert 28 of a compliant and maybe damping material, such as a foamed plastic. The carrier is held in the plug 27, against longitudinal movement, by means of a cross pin 29 which passes through openings in the plug, the insert and the end of the stylus carrier. The connection between the crosspin 29 and the end of the stylus carrier is free enough to allow the carrier to have a degree of freedom for movement in the horizontal transverse direction, so that the stylus in use can follow the excursions of a laterally recorded record groove, and also in the transverse direction so as to permit the stylus tip to present a sufficiently high vertical compliance. At its rearward end the plug 27 is formed with an integral cross extension 27*a*, more clearly shown in FIGURE 2.

The fixing plug 27 for the stylus is received in a receptacle formed by an approximately cylindrical recess in the forward end of the holder 24. Conveniently, the holder 24 is made of a resilient plastic material so that the plug can be sprung into the correspondingly shaped end of the socket. When this is done, and the end of the cross member 27 is accommodated in a correspondingly shaped receptacle at the end of the holder 24, the side extension 24*a* forms, with a complementarily shaped part on the end of the holder a substantially cylindrical enlargement, which is accommodated, in the way which will be seen more clearly in FIGURE 2, between shoulders 10*a*, 10*b* and 11*a*, 11*b* formed on the two parts of the casing. This arrangement both locates the stylus carrying plug angularly, and also holds it against being withdrawn axially from the holder. The plug member 27 is also formed with a small forward extension 27*b*, so that by inserting a small tool, or a finger nail, beneath this projection the stylus can be easily sprung out of the holder.

In use, the lever 25 can be moved to either extreme positions, so that stylus 16 or 17 will be in the downward, operative position. When a record is played with the cartridge the stylus in use will vibrate in a horizontal plane, and this motion will be imparted to the element 12, through the front pad 13, which also has a coupling means as well as a front mounting, for the element 12. Accordingly, the pads 13 and 14 are formed of a material having suitable, mechanical properties, being of appropriate compliance and frictional loss factor.

What I claim is:

1. A gramophone pickup, comprising:

a casing (10, 11) containing a chamber;

a transducer element (12);

means (14) mounting said transducer element in said casing chamber;

elongated stylus carrier means (15) including at one end a pair of oppositely extending styli (16, 17);

means connecting said stylus carrier means with said casing, comprising a cylindrical stylus holder (24) connected with said casing for rotation about its longitudinal axis, said stylus holder containing at one end a recess, an attachment member (27) removably mounted at one end in said recess, and compliance member means (28) connecting the other end of said stylus carrier with the free end of said attachment member, said stylus carrier means, said stylus holder and said attachment member being colinearly arranged whereby said stylus carrier means is rotatable about its longitudinal axis between a first position in which only one stylus is arranged in an operative condition and a second position in which only the other stylus is arranged in an operative condition; and drive means (13) for transmitting to said transducer element any movement imparted to said stylus carrier means, said stylus carrier means being restrained against movement in the longitudinal direction.

2. Apparatus as defined in claim 1, wherein said attachment member is mounted with a frictional fit within the recess contained in said stylus holder.

3. Apparatus as defined in claim 2, and further including means preventing rotation of said stylus holder.

4. Apparatus as defined in claim 1, and further including lever means (25) for manually rotating said stylus holder about its longitudinal axis.

5. Apparatus as defined in claim 1, wherein said casing comprises a pair of longitudinal sections (10, 11), the adjacent portions of said casing sections defining a recess in which said stylus holder is rotatably mounted.

6. Apparatus as defined in claim 5, and further including detent means for retaining said stylus carrier in the positions in which the styli are alternately in use.

7. Apparatus as defined in claim 6, wherein said detent means comprises non-circular portions on said stylus holder, and resilient means connected with said casing for engagement with said non-circular portions.

References Cited

UNITED STATES PATENTS

| | | | |
|---|---|---|---|
| 2,798,120 | 7/1957 | Sabol | 274—36 X |
| 2,848,559 | 8/1958 | Palo | 274—36 X |
| 3,236,956 | 2/1966 | Kantrowitz | 274—36 X |
| 3,294,925 | 12/1966 | Dally et al. | 274—37 X |

HARRY N. HAROIAN, *Primary Examiner.*

U.S. Cl. X.R.

274—37